March 4, 1952 — A. T. SHACK ET AL — 2,587,774
GAUGING AND MARKING DEVICE
Filed Sept. 7, 1950 — 3 Sheets-Sheet 2

Inventors:
ANDREW T. SHACK and
WILLIAM L. ZEMBERRY,
by: Donald G. Dalton
their Attorney.

Patented Mar. 4, 1952

2,587,774

UNITED STATES PATENT OFFICE 2,587,774

GAUGING AND MARKING DEVICE

Andrew T. Shack, Brentwood, and William L. Zemberry, Pittsburgh, Pa., assignors to United States Steel Company, a corporation of New Jersey Application September 7, 1950, Serial No. 183,604

14 Claims. (Cl. 33—143)

This invention relates to improved devices for gauging pipe wall thickness and for marking the plane at which the end portions of pipe lengths are to be cropped.

When pipe is manufactured, the walls at the end portions of each length commonly are of uneven thickness and it is necessary to crop each length a sufficient distance from the end so that the walls of the entire length meet specified standards. In some instances it is necessary only that the pipe wall thickness be above a specified minimum, but in others it is necessary as well that it be below a specified maximum. In previous practice with which we are familiar, pipe walls are gauged manually to determine how much to crop off each length, and after they are cropped, it has been necessary to recheck the thickness and often to crop off a further portion.

An object of the present invention is to provide improved gauging and marking devices which automatically gauge a pipe length and mark the plane closest to the end where the walls are of acceptable thickness throughout the circumference, so that the pipe can be cropped at this plane.

A further object of the invention is to provide an improved gauging and marking device, the gauging means of which automatically traverses a pipe wall longitudinally until it finds a plane where the wall thickness appears acceptable, and then automatically traverses the pipe circumferentially to mark this plane and to determine whether the wall thickness at this plane is acceptable throughout the circumference.

A further object of the invention is to provide an improved gauging and marking device, the gauging means of which, after it finds a plane where the wall thickness appears acceptable but the thickness is not acceptable throughout the circumference, automatically resumes its longitudinal traversal of the pipe wall until it finds another plane where the wall thickness appears acceptable, and which then automatically repeats its circumferential traversal and marking of the pipe.

A further object of the invention is to provide an improved gauging device which automatically discharges pipe lengths, either unmarked or marked through only a part of their circumference, when there is no plane of acceptable wall thickness within the limits of the device.

In accomplishing these and other objects of the invention, we have provided improved details of structure, preferred forms of which are shown in the accompanying drawings, in which.

Figure 1:
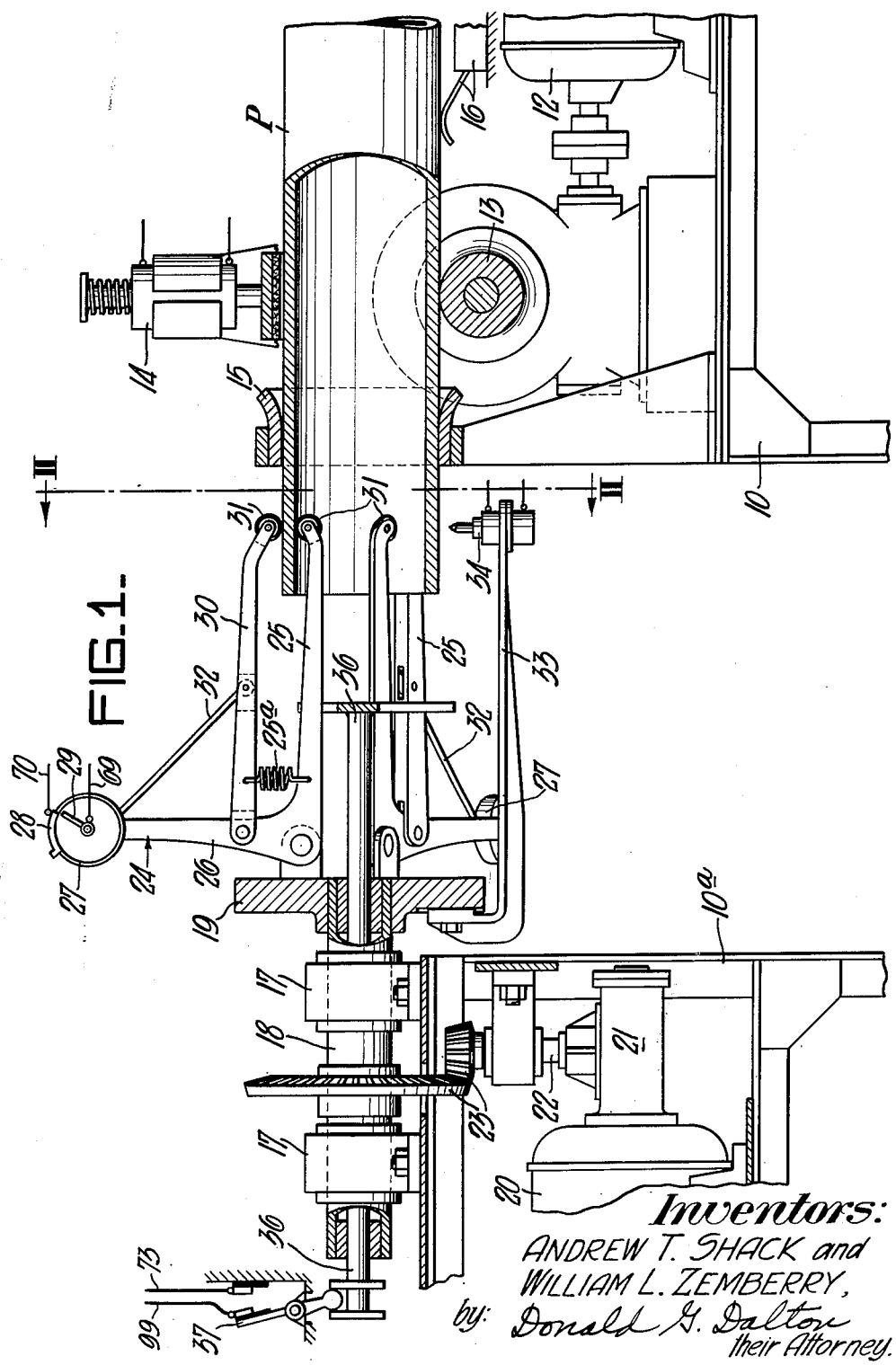
Figure 1 is a side elevational view, partly in section of a gauging and marking device which embodies features of the present invention.
Figure 2:
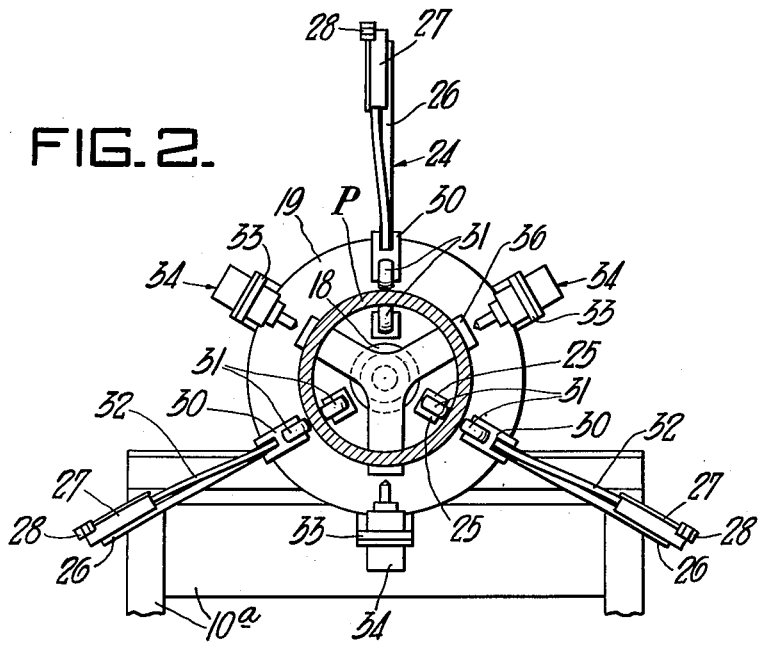
Figure 2 is a vertical sectional view taken substantially on line II—II of Figure 1.

The gauging and marking device of the present invention is mounted on a suitable support structure which conveniently can be in the form of table sections 10 and 10a. Table section 10 carries a reversible conveying motor 12, a conveyor roll 13, a normally retracted solenoid operated brake 14, a guide 15 and an operating switch 16. A pipe length P, whose end portion is to be gauged and marked for cropping, is introduced to the device on conveyor roll 13 and it engages the operating switch 16 and starts conveyor motor 12. This motor now drives the conveyor roll in its forward direction and feeds the pipe length through guide 15 toward the gauging head hereinafter described. When the solenoid of brake 14 is energized, the brake clamps the pipe in a fixed position, but otherwise the brake is retracted and free of the pipe.

Table section 10a carries bearings 17 which rotatably support a tubular drive shaft 18. The end of drive shaft 18 carries a gauging head 19. The device has a drive motor 20 which rotates the drive shaft via a speed reducing gearing 21, an upright shaft 22 and a bevel pinion and gear 23.

Gauging head 19 has a plurality of thickness gauges 24, preferably three in number, pivoted to its outer face and uniformly spaced thereon. It is apparent that various known types of thickness gauges could be employed, such as electronic gauges, magnetic gauges, supersonic gauges or electric gauges, but the form we have chosen for illustration operates mechanically. Each gauge 24 includes a bell crank which has a gauge arm 25 extending approximately perpendicular to the gauging head and a radially extending arm 26. The outer end of each arm 26 carries a dial 27 which on its face has a contact segment 28 and a contact hand 29. A gauge arm 30 is pivoted to each bell crank and extends in approximately the same direction as gauge arm 25 of the bell crank. A spring 25a normally biases the gauge arms toward each other. The free extremities of gauge arms 25 and 30 carry rollers 31 or other means adapted to contact and traverse the inner and outer surfaces of pipe walls. A linkage 32 connects the gauge arm 30 and the contact hand 29, so that relative movement of the two gauge arms in accordance with variations in wall thickness moves the hand. Contact segment 28 and the hand are adjusted relatively so that the hand contacts the segment whenever the wall thickness is acceptable, but rides off the segment whenever the wall is too thin or too thick.

Gauging head 19 also carries a plurality of brackets 33, preferably three in number. Each bracket carries at its free end a normally retracted solenoid operated marker 34, the tip of which is in the same plane as the points where rollers 31 contact the pipe wall. When the solenoids of these markers are energized, they project the marker tips into contact with the pipe wall, but otherwise the markers clear the wall.

As the conveyor roll 13 feeds the pipe length into gauges 24, the gauges traverse the pipe wall longitudinally and all three gauges simultaneously may find points on the pipe where the wall thickness appears acceptable. When they find such points, they move their contact hands 29 into contact with their respective segments 28. As hereinafter explained, these hands and segments are electrically connected in series and they energize a circuit which stops motor 12, applies brake 14 to the pipe, projects markers 34 and starts drive motor 20. This latter motor rotates the drive shaft 18 and the gauging head 19, and thus the gauges traverse the pipe wall circumferentially.

If the pipe wall thickness is acceptable throughout the pipe circumference, hands 29 all remain in contact with their segments 28 throughout rotation of the gauging head. The gauging head automatically stops after the gauges have traversed the entire pipe circumference, in this instance, after rotating approximately 120°. Markers 34 thus place a completely encircling mark on the pipe wall. When the gauging head stops, the circuit retracts the markers, releases brake 14 and drives the conveyor motor 12 and conveyor roll 13 in the reverse direction to withdraw the pipe marked for cropping. In describing the electric circuit we refer to this condition as "Case A."

As the gauging head rotates, one or more of the gauges 24 may find places where the pipe wall thickness is unacceptable. One or more of the hands 29 then ride off their respective segments 28 and break the circuit. The gauging head then stops, markers 34 are retracted, brake 14 is released and conveyor motor 12 again is driven in its forward direction to feed the pipe length farther into the device. Gauges 24 thus resume their longitudinal traversal of the pipe wall. If the three gauges again find a place where the wall thickness appears acceptable, the circumferential traverse just described is repeated; that is, the circuit again applies the brake, projects the markers and rotates the gauging head. If this time the thickness is acceptable throughout the circumference, the conveyor withdraws the pipe as before marked for cropping. The incomplete marks of course are disregarded. This sequence of stopping the gauging head, resuming the longitudinal traversal, and again rotating the gauging head can be repeated any number of times until the pipe feeds into gauges 24 to the limit of the device. In describing the circuit we refer to this condition as "Case B."

The gauging head 19 also carries a plunger 36, which has a spindle extending through the bore of drive shaft 18. If the gauges 24 never find a plane on the pipe where the wall thickness is acceptable, the pipe end ultimately abuts this plunger. The spindle of said plunger controls a reversing switch 31, hereinafter described, which completes a circuit to motor 12 for driving it in its reverse direction and thus withdrawing the pipe. Such a pipe length either is not marked at all or else the marks are incomplete, and it immediately can be recognized as one whose wall thickness is not acceptable for the distance which the gauging device covers. In describing the circuit, we refer to this condition as "case C."

Figure 3:
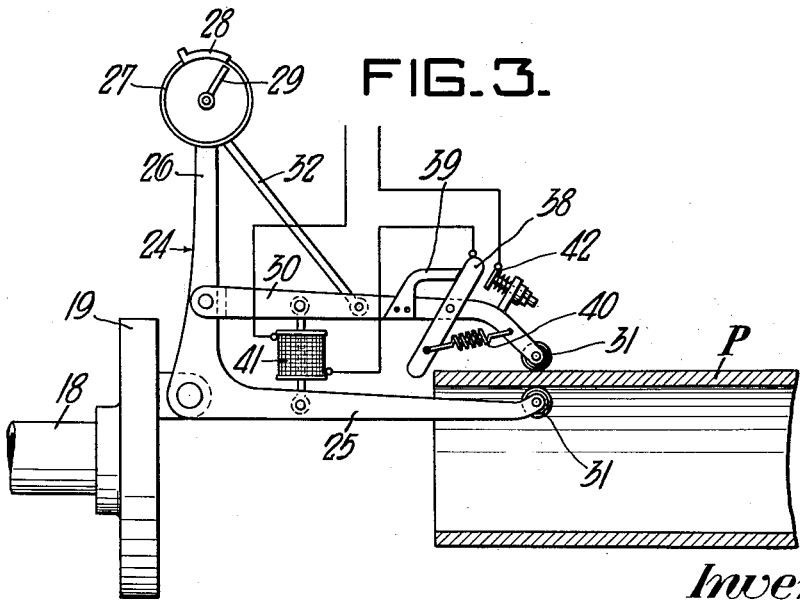
Figure 3 is a fragmentary side elevational view of a modification.

Figure 3 illustrates a modification in which the gauge arms are equipped with means for keeping rollers 31 out of contact with the pipe wall when the extreme end portion of the pipe is between these rollers. Such means are desirable since the gauge mechanism necessarily is delicate and the pipe ends often have major irregularities which could cause damage. The two gauge arms are biased to a normally spread position. Gauge arm 30 carries a pivoted lever 38 and a fixed stop 39. A spring 40 normally holds said lever in engagement with said stop. A double armature solenoid 41 connects the two gauge arms, and when energized pulls them together into engagement with the pipe wall. Arm 30 carries a contact point 42. When the pipe end is within the space between the two gauge arms, it clears rollers 31 on both arms until it contacts the inner end of lever 38. This lever then pivots against contact point 42 and completes a circuit to solenoid 41, whereupon the solenoid draws the arms together. The operation is the same when the conveyor is withdrawing the pipe.

Figure 4:
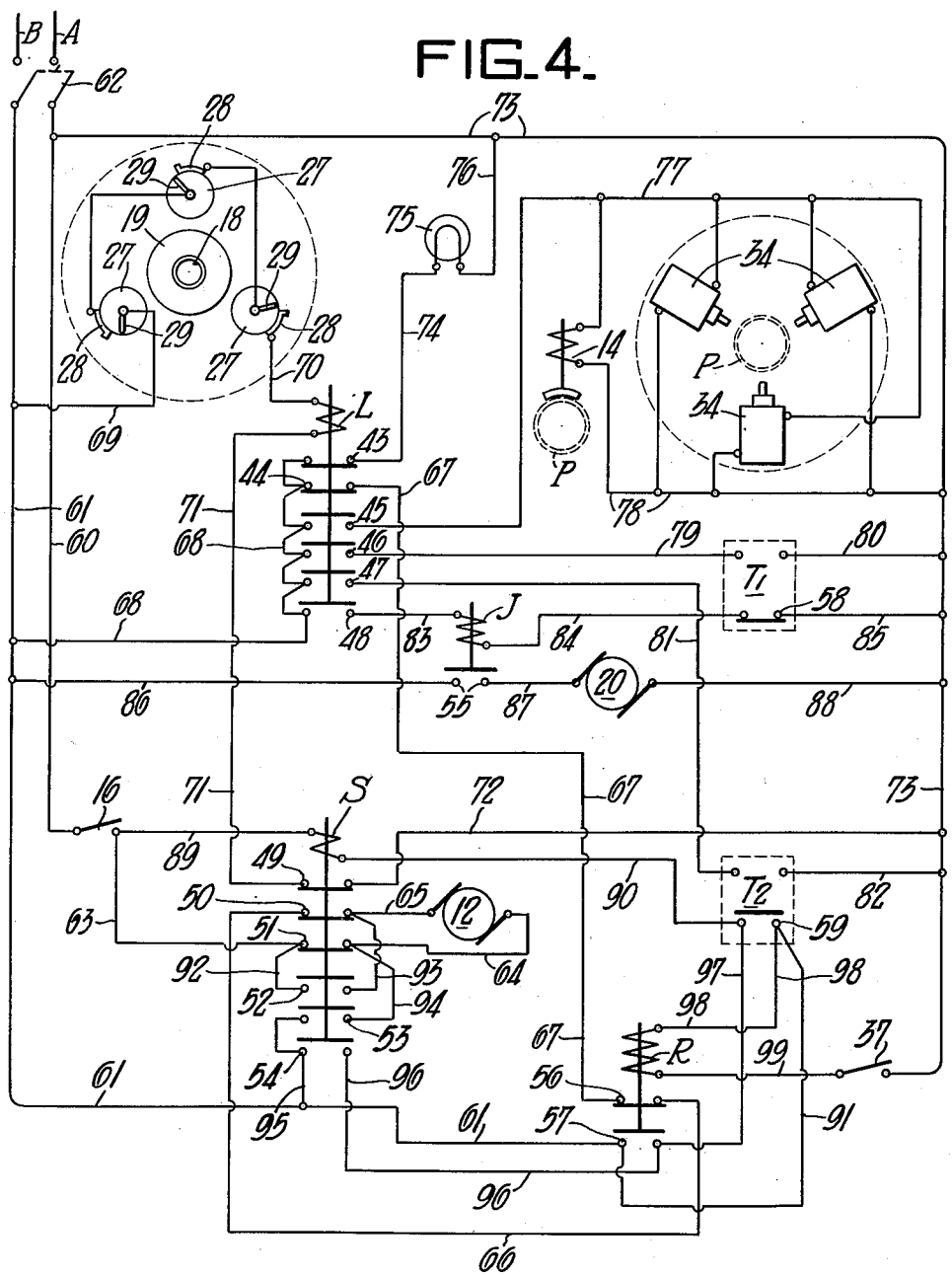
Figure 4 is a wiring diagram of a preferred electric circuit for operating the device.

Figure 4 shows in detail a preferred electric circuit for operating the device. The circuit includes four relays L, S, J and R and two timer relays $T_1$ and $T_2$. Relay L has two normally closed sets of contacts 43 and 44 and four normally open sets of contacts 45, 46, 47 and 48. Relay S has three sets of normally closed contacts 49, 50 and 51 and three sets of normally open contacts 52, 53 and 54. Relay J has one set of normally open contacts 55. Relay R has one set of normally closed contacts 56 and one set of normally open contacts 57. Timer relay $T_1$ has one set of normally closed contacts 58 and timer relay $T_2$ one set of normally open contacts 59. Lines 60 and 61 connect the circuit to outside power lines A and B through a disconnect switch 62.

Line 60 is connected to one side of the operating switch 16. A conductor 63 connects the other side of this switch to one contact of the normally closed set 51 of relay S. A conductor 64 connects the other contact of set 51 with one side of conveyor motor 12. A conductor 65 connects the other side of said conveyor motor with one contact of the normally closed set 50 of relay S. A conductor 66 connects the other contact of set 50 with one contact of the normally closed set 56 of relay R. A conductor 67 connects the other contact of set 56 with one contact of the normally closed set 44 of relay L. A conductor 68 connects one contact of each of the five sets of contacts on relay L with line 61. When pipe P closes the operating switch 16, conveyor motor 12 and conveyor roll 13 turn in their forward direction and feed the pipe toward the gauging head 19. The current path is from line 60, through switch 16, conductor 63, contacts 51, conductor 64, motor 12, conductor 65, contacts 50, conductor 66, contacts 56, conductor 67, contacts 44, and conductor 68 to line 61.

As already stated, the contact segments 28 and hands 29 are electrically connected in series. A conductor 69 connects the series of segments and hands to line 61 and a conductor 70 connects the series of segments and hands to one end of the coil of relay L. A conductor 71 connects the other end of the coil of relay L with one contact of the normally closed set 49 of relay S. A conductor 72 connects the other contact of set 49 with a conductor 73 which is connected to line 60. When the three gauges 24 find a plane in the pipe wall where the thickness appears acceptable, and their hands 29 all contact their respective segments 28, the circuit energizes relay L. The current path is from line 61, through conductor 69, the series of segments 28 and hands 29, conductor 70, the relay coil, conductor 71, contacts 49, and conductors 72 and 73 to line 60.

A conductor 74 connects one contact of the normally closed set 43 of relay L with a signal lamp 75. A conductor 76 connects this lamp with conductor 73 and line 60. A conductor 77 connects one contact of the normally open set 45 of relay L with one end of the solenoids of brake 14 and markers 34. A conductor 78 connects the other end of these solenoids with conductor 73 and line 60. A conductor 79 connects one contact of the normally open set 46 of relay L with one end of the coil of timer relay $T_1$. A conductor 80 connects the other end of said timer relay coil with conductor 73 and line 60. A conductor 81 connects one contact of the normally open set 47 of relay L with one end of the coil of timer relay $T_2$. A conductor 82 connects the other end of said latter timer relay coil with conductor 73 and line 60. A conductor 83 connects one contact of the normally open set 48 of relay L with one end of the coil of relay J. A conductor 84 connects the other end of the coil of relay J with one contact of the normally closed set 58 of timer relay $T_1$. A conductor 85 connects the other contact of set 58 with conductor 73 and line 60.

Closing of disconnect switch 62 energizes lamp 75 and thus indicates that the device is ready to function. The current path is from line 61, through conductor 68, contacts 43, conductor 74, lamp 75, and conductors 76 and 73 to line 60. Subsequent energizing of relay L opens its normally closed contacts 43 and thus extinguishes the lamp, which now indicates that the three gauges have found pipe wall of acceptable thickness and they are about to commence their circumferential traversal of the pipe wall.

Energizing of relay L also opens its normally closed contacts 44, which breaks the circuit to conveyor motor 12 and thus stops this motor and conveyor roll 13. Preferably this motor has a brake for stopping it the moment the circuit is broken, as known in the art. Energizing relay L also closes its normally open contacts 45, 46, 47 and 48. Closing of contacts 45 energizes the solenoids of brake 14 and markers 34 and thus applies the brake to the pipe and projects the markers. The current path is from line 61, through conductor 68, contacts 45, conductor 77, the solenoids, and conductors 78 and 73 to line 60. Closing of contacts 46 energizes timer relay $T_1$. The current path is from line 61 through conductor 68, contacts 46, conductor 79, the timer relay coil, and conductors 80 and 73 to line 60. Closing of contacts 47 energizes timer relay $T_2$. The current path is from line 61, through conductor 68, contacts 47, conductor 81, the timer relay coil, and conductors 82 and 73 to line 60. When the timer relays are energized, both commence timing. After a predetermined interval timer relay $T_1$ times out and opens its normally closed contacts 58 and after a predetermined longer interval timer $T_2$ times out and closes its normally open contacts 59. Closing of contacts 48 of relay L energizes relay J. The current path is from line 61 through conductor 68, contacts 48, conductor 83, the relay coil, conductor 84, contacts 58, and conductors 85 and 73 to line 60.

A conductor 86 connects line 61 with one contact of the normally open set 55 of relay J. A conductor 87 connects the other contact of set 55 with one side of drive motor 20. A conductor 88 connects the other side of drive motor 20 with conductor 73 and line 60. When relay J is energized and its contacts close, drive motor 20 commences to rotate. The current path is from line 61, through conductor 86, contacts 55, conductor 87, the motor, and conductors 88 and 73, to line 60. The motor rotates the gauging head 19, and the gauges 24 commence their circumferential traversal of the pipe wall.

When "case A" applies, relay J stays energized until timer relay $T_1$ times out. This timer relay is adjusted to time out after the drive motor 20 has rotated the gauging head 19 through 120° so that the gauges 24 traverse the full circumference of the pipe wall. When timer relay $T_1$ times out, its contacts 58 open and break the circuit to the coil of relay J. Thereupon contacts 55 of relay J open and break the circuit to motor 20. Subsequently timer $T_2$ times out and completes a circuit for withdrawing the pipe from the device, as hereinafter explained.

When "case B" applies, one or more of the hands 29 rides off its segment 28 and breaks the circuit to the coil of relay L. The contacts of this relay thereupon return to their normal position. Lamp 75 is energized; brake 14 is released; markers 34 are retracted; conveyor motor 12 again starts moving in its forward direction; and timer relays $T_1$ and $T_2$ are de-energized. The conveyor continues to feed the pipe toward the gauging head until the three gauges again find acceptable pipe wall, whereupon relay L again is energized and the sequence of steps previously described is repeated. When timer relays $T_1$ and $T_2$ are thus interrupted, they time for their full interval on again being energized. If the three gauges do not again find acceptable wall, the end of the pipe ultimately abuts plunger 36 and the pipe is removed, as in "case C" hereinafter described.

Relay S controls reversals of the conveyor motor 12. A conductor 89 connects one end of the coil of this relay with one side of operating switch 16. A conductor 90 connects the other end of this relay coil with one contact of the normally open set 59 of timer relay $T_2$. A conductor 91 connects the other contact of set 59 with line 61. A conductor 92 connects conductor 63 with one contact of the normally open set 52 of relay S. A conductor 93 connects the other contact of set 52 with conductor 65. A conductor 94 connects conductor 64 with one contact of the normally open set 53 of relay S. A conductor 95 connects the other contact of set 53 with one contact of the normally open set 54 of relay S and thence with line 61. A conductor 96 connects the other contact of set 54 with one contact of the normally open set 57 of relay R. A conductor 97 connects this same contact of set 57 with conductor 90. The end of line 61 is connected to the other contact of set 57.

When timer relay T₂ times out and its contacts 59 close, it energizes relay S. The current path is from line 60, through operating switch 16, conductor 89, the relay coil, conductor 90, contacts 59 and conductor 91, to line 61. Thereupon its contacts 49, 50 and 51 open and its contacts 52, 53 and 54 close. Closing of contacts 54 seals in the relay. The current path is now from line 60, through operating switch 16, conductor 89, the relay coil, conductors 90, 97 and 96, contacts 54 and conductor 95, to line 61. Opening of contacts 49 breaks the circuit relay coil L, whereupon the contacts of relay L return to their normal position, breaking the circuits to the solenoids of brake 14 and markers 34, and to the coils of timer relays T₁ and T₂. The contacts 58 of timer T₁ return to their normally closed position, but do not energize relay J since the contacts 48 of relay L are now open. The contacts 59 of timer relay T₂ return to their normally open position, but do not de-energize relay S, since this relay has sealed in. Opening of contacts 50 and 51 of relay S and closing of its contacts 52 and 53, starts conveyor motor 12 but in the reverse direction. The current path is from line 60, through operating switch 16, conductors 63 and 92, contacts 52, conductors 93 and 65, the motor, conductors 64 and 94, contacts 53 and conductor 95, to line 61. Motor 12 rotates conveyor roll 13 and withdraws pipe P from the device until the pipe clears operating switch 16, whereupon this switch opens and de-energizes relay S, which returns to its normal position and thus breaks the motor circuit.

The reversing switch 37 and relay R operate relay S and establish a circuit for withdrawing the pipe when the gauges 24 never find a plane of acceptable wall thickness ("case C"). A conductor 98 connects conductor 91 with one end of the coil of relay R. A conductor 99 connects the other end of this coil with one side of the reversing switch 37. The conductor 73 is connected to the other side of this switch. When a pipe end abuts plunger 36 and closes this switch, relay R is energized. The current path is from line 61, through conductors 91 and 98, the relay coil, conductor 99, switch 37, conductor 73 to line 60. Thereupon the normally closed contacts 56 open and the normally open contacts 57 close.

Closing of contacts 57 energizes relay S. The current path is from line 60 through the operating switch 16, conductor 89, the relay coil, conductors 90 and 97, and contacts 57, to line 61. The action of relay S in reversing the circuit to the conveyor motor is the same as already described. Opening of contacts 56 breaks the forward circuit to motor 12. It is seen that energizing relay S opens its contacts 50 and ultimately would break this same circuit, but it is preferable to stop the conveyor motor sooner than the time required for both relays to act.

From the foregoing description it is seen that the gauging and marking device of the present invention is of simple mechanical construction and it automatically marks the plane closest to the end of a pipe length where the walls are of acceptable thickness. Pipe lengths discharged from the apparatus bear completely encircling marks at the proper plane for cropping, and, when they bear no such mark, they can easily be recognized as having no plane of acceptable wall thickness within the limits of the device.

While we have shown and described only certain preferred embodiments of the invention, it is apparent that modifications may arise. Therefore, we do not wish to be limited to the disclosure set forth but only by the scope of the appended claims.

We claim:

1. A device for gauging the thickness of pipe walls and marking a plane for cropping comprising gauge means, means for relatively feeding and withdrawing a pipe length toward and from said gauge means, said gauge means being adapted to traverse the pipe wall longitudinally while the pipe feeds relatively theretoward, means for relatively rotating said gauge means around the pipe, said gauge means being adapted to traverse the pipe wall circumferentially as it rotates relatively therearound, and means for marking the plane at which said gauge means traverses the pipe wall circumferentially.

2. A device for gauging the thickness of pipe walls and marking a plane for cropping comprising rotatably mounted gauge means, a conveyor for feeding and withdrawing a pipe length toward and from said gauge means, said gauge means being adapted to traverse the pipe wall longitudinally while said conveyor feeds the pipe theretoward, means for rotating said gauge means around the pipe, said gauge means being adapted to traverse the pipe wall circumferentially as it rotates therearound, and means for marking the plane at which said gauge means traverses the pipe wall circumferentially.

3. A device for gauging the thickness of pipe walls and marking a plane for cropping comprising gauge means, means for relatively feeding and withdrawing a pipe length toward and from said gauge means, said gauge means being adapted to traverse the pipe wall longitudinally while the pipe feeds relatively theretoward, means stopping relative feeding of the pipe when said gauge means finds a plane where the wall thickness appears acceptable, means for relatively rotating said gauge means around the pipe when the relative feeding stops, said gauge means being adapted to traverse the pipe wall circumferentially as it rotates relatively therearound, and means for marking the plane at which said gauge means traverses the pipe wall circumferentially.

4. A device for gauging the thickness of pipe walls and marking a plane for cropping comprising rotatably mounted gauge means, a conveyor for feeding and withdrawing pipe lengths toward and from said gauge means, said gauge means being adapted to traverse the pipe wall longitudinally while said conveyor feeds the pipe theretoward, a brake adapted to hold the pipe, means for stopping said conveyor and applying said brake when said gauging means finds a plane where the wall thickness appears acceptable, means for rotating said gauge means around the pipe when said conveyor stops, said gauge means being adapted to traverse the pipe wall circumferentially as it rotates therearound, and means for marking the plane at which said gauge means traverses the pipe wall circumferentially.

5. A device for gauging the thickness of pipe walls and marking a plane for cropping comprising a rotatably mounted gauging head, a plurality of thickness gauges mounted on said gauging head, a conveyor for feeding and withdrawing pipe lengths toward and from said gauges, said gauges being adapted to traverse the pipe wall longitudinally while said conveyor feeds the pipe theretoward, a brake adapted to hold the pipe, means for stopping said conveyor and applying said brake when said gauges find a plane where the wall thickness appears acceptable, means for rotating said gauging head when said conveyor stops and thereby rotating said gauges around the pipe, said gauges being adapted to traverse the pipe wall circumferentially as they rotate therearound, and means for marking the plane at which said gauges traverse the pipe wall circumferentially.

6. A device for gauging the thickness of pipe walls and marking a plane for cropping comprising gauge means, means for relatively feeding and withdrawing a pipe length toward and from said gauge means, said gauge means being adapted to traverse the pipe wall longitudinally while the pipe feeds relatively thereto, means stopping relative feeding of the pipe when said gauge means finds a plane where the wall thickness appears acceptable, means for relatively rotating said gauge means around the pipe when the relative feeding stops, said gauge means being adapted to traverse the pipe wall circumferentially as it rotates relatively therearound, means for marking the plane at which said gauge means traverses the pipe wall circumferentially, and means for operating said relative feeding and withdrawing means to withdraw the pipe when said gauging means completes its circumferential traversal of the pipe wall or when the pipe feeds relatively to the limit of the device.

7. A device for gauging the thickness of pipe walls and marking a plane for cropping comprising a rotatably mounted gauging head, a plurality of thickness gauges mounted on said gauging head, a conveyor for feeding and withdrawing pipe lengths toward and from said gauges, said gauges being adapted to transverse the pipe wall longitudinally while said conveyor feeds the pipe theretoward, a normally retracted brake adapted to hold the pipe when applied thereto, means for stopping said conveyor and applying said brake when said gauges find a plane where the wall thickness appears acceptable, means for rotating said gauging head when said conveyor stops and thereby rotating said gauges around the pipe, said gauges being adapted to traverse the pipe wall circumferentially as they rotate therearound, means for marking the plane at which said gauges traverse the pipe circumferentially, and means for operating said conveyor to withdraw the pipe when said gauges complete their circumferential traversal of the pipe wall or when the conveyor feeds the pipe to the limit of the device.

8. A device for gauging the thickness of pipe walls and marking a plane for cropping comprising gauge means, means for relatively feeding and withdrawing a pipe length toward and from said gauge means, said gauge means being adapted to traverse the pipe wall longitudinally while the pipe feeds relatively theretoward, means stopping relative feeding of the pipe when said gauge means finds a plane where the wall thickness appears acceptable, a plurality of normally retracted markers carried by said gauge means, and means for projecting said markers into contact with the pipe wall and for relatively rotating said gauge means and markers around the pipe when the relative feeding stops, said gauge means being adapted to traverse the pipe wall circumferentially and said markers to mark the plane thereof as they rotate relative to the pipe.

9. A device for gauging the thickness of pipe walls and marking a plane for cropping comprising a rotatably mounted gauging head, a plurality of thickness gauges and a plurality of normally retracted markers mounted on said gauging head, a conveyor for feeding and withdrawing pipe lengths toward and from said gauges, said gauges being adapted to traverse the pipe wall longitudinally while said conveyor feeds the pipe theretoward, a normally retracted brake adapted to hold the pipe when applied thereto, means for stopping said conveyor, applying said brake and projecting said markers into contact with the pipe wall when said gauges find a plane where the wall thickness appears acceptable, and means for rotating said gauging head when said conveyor stops and thereby rotating said gauges and markers around the pipe, said gauges being adapted to traverse the pipe wall circumferentially and said markers to mark the plane thereof as they rotate around the pipe.

10. A device for gauging the thickness of pipe walls and marking a plane for cropping comprising a rotatably mounted gauging head, a plurality of thickness gauges and a plurality of normally retracted markers mounted on said gauging head, a conveyor for feeding and withdrawing pipe lengths toward and from said gauges, said gauges being adapted to traverse the pipe wall longitudinally while said conveyor feeds the pipe theretoward, a normally retracted brake adapted to hold the pipe when applied thereto, means for stopping said conveyor, applying said brake and projecting said markers into contact with the pipe wall when said gauges find a plane where the wall thickness appears acceptable, means for rotating said gauging head when said conveyor stops and thereby rotating said gauges and markers around the pipe, said gauges being adapted to traverse the pipe wall circumferentially and said markers to mark the plane thereof as they rotate around the pipe, and means for automatically operating said conveyor to withdraw the pipe when said gauges complete their circumferential traversal of the pipe wall or when the conveyor feeds the pipe to the limit of the device.

11. A device for gauging the thickness of pipe walls and marking a plane for cropping comprising a rotatably mounted gauging head, a plurality of thickness gauges mounted on said gauging head each of which includes a pair of gauge arms having means on their extremities adapted to contact the inner and outer surfaces of a pipe wall, a conveyor for feeding and withdrawing pipe lengths toward and from said gauges, said gauges being adapted to traverse the pipe wall longitudinally while said conveyor feeds the pipe theretoward, a normally retracter brake adapted to hold the pipe when applied thereto, means for rotating said gauging head, an electric circuit which is completed when said gauges find a plane where the wall thickness appears acceptable, means in said circuit for stoping said conveyor, applying said brake and starting rotation of said gauging head when the circuit is completed, said gauges being adapted to traverse the pipe wall circumferentially on rotation of said gauging head, and means for marking the plane at which said gauges traverse the pipe wall circumferentially.

12. A device for gauging the thickness of pipe walls and marking a plane for cropping comprising a rotatably mounted gauging head, a plurality of thickness gauges mounted on said gauging head each of which includes a pair of gauge arms having means on their extremities adapted to contact the inner and outer surfaces of a pipe wall, means for holding said gauge arms out of contact with the pipe walls when the extreme ends of the pipe pass their contact means, a conveyor for feeding and withdrawing pipe lengths toward and from said gauges, said gauges being adapted to traverse the pipe wall longitudinally while said conveyor feeds the pipe theretoward, a normally retracted brake adapted to hold the pipe when applied thereto, means for rotating said gauging head, an electric circuit which is completed when said gauges find a plane where the wall thickness appears acceptable, means in said circuit for stopping said conveyor, applying said brake and starting rotation of said gauging head when the circuit is completed, said gauges being adapted to traverse the pipe wall circumferentially on rotation of said gauging head, and means for marking the plane at which said gauges traverse the wall circumferentially.

13. A device for gauging the thickness of pipe walls and marking a plane for cropping comprising a rotatably mounted gauging head, a plurality of thickness gauges mounted on said gauging head each of which includes a pair of gauge arms having means in the same plane on their extremities adapted to contact the inner and outer surfaces of a pipe wall, a plurality of normally retracted markers mounted on said gauging head intermediate said gauges and having tips in the same plane as the contact means on said gauge arms, a conveyor for feeding and withdrawing pipe lengths toward and from said gauges, said gauges being adapted to traverse the pipe wall longitudinally while said conveyor feeds the pipe theretoward, a normally retracted brake adapted to hold the pipe when applied thereto, means for stopping said conveyor, applying said brake, and projecting said markers so that their tips contact the pipe wall when said gauges find a plane where the wall thickness appears acceptable, and means for rotating said gauging head when said conveyor stops and thereby rotating said gauges and markers around the pipe, said gauges being adapted to traverse the pipe circumferentially and said markers to mark the plane of contact as they rotate around the pipe.

14. A device for gauging the thickness of pipe walls and marking a plane for cropping comprising a rotatably mounted gauging head, a plurality of thickness gauges mounted on said gauging head each of which includes a pair of gauge arms having means in the same plane on their extremities adapted to contact the inner and outer surfaces of a pipe wall, a plurality of normally retracted markers mounted on said gauging head intermediate said gauges and having tips in the same plane as the contact means on said gauge arms, a conveyor for feeding and withdrawing pipe lengths toward and from said gauges, said gauges being adapted to traverse the pipe wall longitudinally while said conveyor feeds the pipe theretoward, a normally retracted brake adapted to hold the pipe when applied thereto, means for rotating said gauging head, an electric circuit which is completed when said gauges find a plane where the wall thickness appears acceptable, means in said circuit for stopping said conveyor, applying said brake, projecting said markers and starting rotation of said gauging head when the circuit is completed, said gauges being adapted to traverse the pipe wall circumferentially and said markers to mark the plane of contact on rotation of said gauging head, and means in said circuit for automatically operating said conveyor to withdraw the pipe when said gauges complete their circumferential traversal of the pipe wall or when the conveyor feeds the pipe to the limit of the device.

ANDREW T. SHACK.
WILLIAM L. ZEMBERRY.

No references cited.